(12) United States Patent
Ishizuka et al.

(10) Patent No.: US 7,375,460 B2
(45) Date of Patent: May 20, 2008

(54) ELECTRON EMITTING DEVICE AND METHOD OF MANUFACTURING THE SAME

(75) Inventors: Yoshiki Ishizuka, Tokyo (JP); Katsuyuki Naito, Tokyo (JP); Masahiko Yamamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/453,822

(22) Filed: Jun. 4, 2003

(65) Prior Publication Data

US 2003/0227251 A1 Dec. 11, 2003

(30) Foreign Application Priority Data

Jun. 5, 2002 (JP) ............................. 2002-164672

(51) Int. Cl.
*H01J 1/146* (2006.01)
*H01J 1/304* (2006.01)
*H01J 9/02* (2006.01)

(52) U.S. Cl. ...................................... 313/495; 313/311

(58) Field of Classification Search ................ 313/495, 313/293, 296, 298, 302, 309–311, 336, 351, 313/346 R, 346 DC
See application file for complete search history.

(56) References Cited

U.S. PATENT DOCUMENTS 5,597,338 A * 1/1997 Iwai et al. ..................... 445/51
5,986,389 A * 11/1999 Tsukamoto ................. 313/310
6,366,015 B1 * 4/2002 Shibata ....................... 313/495
6,417,606 B1 * 7/2002 Nakamoto et al. .......... 313/336

FOREIGN PATENT DOCUMENTS

JP 11-297192 * 10/1999

OTHER PUBLICATIONS

Pagnia, H. et al., "Bistable Switching in Electroformed Metal-Insulator-Metal Devices", Review Article, Phys. Stat. Sol. (a) 108, 11 (1988), S10, pp. 11-65, (1998).
Pagnia, H., "Metal-Insulator-Metal Devices with Carbonaceous Current Paths", Int. J. Electronics, vol. 69, No. 1, pp. 33-42, (1990).
Bischoff, M. et al., "Energy Distribution of Emitted Electrons from Electroformed MIM Structures: The Carbon Island Model", Int. J. Electronics, vol. 73, No. 5, pp. 1009-1010, (1992).
Bischoff, M., "Carbon-Nanoslit Model for the Electroforming Process in M-I-M Structures", Int. J. Electronics, vol. 70, No. 3, pp. 491-498, (1991).
Pagnia, H. et al., "Scanning Tunnelling Microscopic Investigations of Electroformed Planar Metal-Insulator-Metal Diodes", Int. J. Electronics, vol. 69, No. 1, pp. 25-32, (1990).

* cited by examiner

*Primary Examiner*—Karabi Guharay
(74) *Attorney, Agent, or Firm*—Finnegan, Henderson, Farabow, Garrett & Dunner, L.L.P.

(57) ABSTRACT

There is provided an electron emitting device, including a substrate, a pair of electrodes formed on the substrate and spaced apart from each other, a pair of electrically conductive layers formed on the electrodes, respectively, a distance between the electrically conductive layers being shorter than a distance between the electrodes, and an electron emitting layer formed between the electrically conductive layers and containing carbon and tin.

5 Claims, 4 Drawing Sheets

ELECTRON EMITTING DEVICE AND METHOD OF MANUFACTURING THE SAME

CROSS-REFERENCE TO RELATED APPLICATIONS

This application is based upon and claims the benefit of priority from the prior Japanese Patent Application No. 2002-164672, filed Jun. 5, 2002, the entire contents of which are incorporated herein by reference.

BACKGROUND OF THE INVENTION

1. Field of the Invention

The present invention relates to an electron emitting device applicable to, for example, a display and a light exposure apparatus and a method of manufacturing the same, particularly, to a cold cathode type electron emitting device having a planar structure and a method of manufacturing the same.

2. Description of the Related Art

In recent years, a cold cathode type electron emitting device having a planar structure has been proposed. The device of this type, which is called a surface conduction device or a planar MIM device, includes a pair of electrodes arranged a prescribed distance apart from each other on a flat insulating substrate, a pair of conductive films formed between these electrodes, and an electron emitting layer formed on these conductive films. The particular electron emitting device, which has a simple structure as described above, is adapted for formation of an electron source array in which a large number of electron emitting devices are arranged on a single substrate.

As an application of the electron source array, a thin planar display has attracted attention. In the thin planar display, the phosphor is excited by electron so as to emit light as in a CRT. Since the energy efficiency of light emission based on the particular principle is high, it is possible to realize a spontaneous light emission type thin planar display achieving a low power consumption and exhibiting a high brightness and a high contrast by using the electron source array noted above.

An example of the planar MIM device is reported by, for instance, Bischoff et al. in "Int. J. Electronics, 1992, VOL. 73, NO. 5, 1009-1010" and "Int. J. Electronics, 1991, VOL. 70, NO. 3, 491-498". FIG. 1 is an oblique view schematically showing the construction of the device reported by Bischoff et al. The planar MIM device shown in FIG. 1 includes a pair of metal electrodes 101a and 101b formed on an insulating substrate 100, a metal film 102 providing a micro-slit between the electrodes 101a and 101b, and a deposited film 103 formed at the position of the micro-slit of the metal film 102. The reference numeral 105 shown in FIG. 1 denotes the width of the micro-slit formed in the metal film 102. The width 105 is about 0.1 μm to 10 μm.

The device having the construction described above is prepared as follows. First, a pair of planar metal electrodes 101a and 101b are formed on the insulating substrate 100. Then, the metal film 102, which is sufficiently thin compared with the electrodes 101a and 101b and is thick enough to achieve electric conduction, is formed between the electrodes 101a and 101b. Further, an electric current is allowed to flow through the electrodes 101a and 101b so as to generate Joule heat in the metal film 102. As a result, the metal film 102 is partially melted and ruptured so as to be made discontinuous. In other words, a micro-slit is formed in the metal film 102. Incidentally, the resistance between the electrodes 101a and 101b is high immediately after the conductive film is rendered discontinuous. The treatment for rendering the conductive film discontinuous by the flow of current through the conductive film is called "B-forming (Basic forming)".

Further, the resultant structure is subjected to a treatment called "A-forming (Adsorption-assisted forming)". In A-forming, a voltage not higher than 20 V is applied between the electrodes 101a and 101b in a vacuum containing hydrocarbons. As a result, the resistance between the electrodes 101a and 101b is lowered over several minutes after application of the voltage, with the result that the current flowing between the electrodes 101a and 101b is increased.

On the other hand, Pagina et al. report in, for example, "Int. J. Electronics, 1990, VOL. 69, NO. 1, 25-32" that the entire region between the electrodes 101a and 101b after the A-forming treatment is covered with a conductive film, and that the conductive film is a thin film containing carbon.

Also, Bischoff et al. report in the publications referred to previously that the light emission is observed in addition to the electron emission by supplying an electric current into the device after the A-forming treatment. It is estimated by Bischoff et al., by the analysis of the emission spectrum, that it is necessary for the material constituting the deposited film 103 to be capable of containing thermoelectrons having a temperature up to 4,000 K and for the particular material itself to be capable of being heated to temperatures exceeding 1,000 K. Such being the situation, Bischoff et al. argue that the conductive film covering the region between the electrodes 101a and 101b after the A-forming, i.e., the deposited film 103, is a graphitized carbon film.

Incidentally, the deposited film 103 is electrically divided into small regions by a single or a plurality of boundaries. The width of the boundary is not larger than the tip of the probe of a scanning tunneling microscope, i.e., not larger than scores of nanometers. Concerning the detailed construction of the boundary portion, it is pointed out by Bischoff et al. in the publications referred to previously that the boundary portion is formed of slits each having a width of scores of nanometers. On the other hand, it is pointed out by Pagina et al. in the publication referred to previously that the edge portions of two carbon-like films overlap each other in the boundary portion. However, the detailed construction of the boundary portion has not yet been clarified sufficiently.

Concerning the current-voltage characteristics, the planar MIM device described above exhibits a VCNR (Voltage Controlled Negative Resistance) characteristics as shown in FIG. 2. Also, concerning the planar MIM device, it is reported by Pagina et al. in "Phys. Stat. Sol. (a) 108, 11(1988)" that the emission efficiency represented by the ratio of the emission current to the current flowing into the device, i.e., the device current, is very small, which is about $10^{-6}$.

The surface conduction device resembles the planar MIM device in construction. An example of the surface conduction device is reported in, for instance, Jpn. Pat. Appln. KOKAI Publication No. 11-297192. When it comes to the manufacturing process of the surface conduction device, an electrically discontinuous portion is formed in a thin film by the process called "forming", followed by depositing a carbon-containing material on the thin film by the process called "activation" as in the manufacturing process of the planar MIM device described above. Compared with the planar MIM device described above, which exhibits the VCNR current-voltage characteristics, the surface conduction device disclosed in, for example, Jpn. Pat. Appln. KOKAI Publication No. 11-297192 referred to previously exhibits monotonously increasing current-voltage characteristics as shown in FIG. 3 in place of the VCNR characteristics. Also, the emission efficiency of the surface conduction device is about $10^{-3}$, which is higher than that for the planar MIM device.

A thin type planar display utilizing the surface conduction device described above exhibits nonlinear current-voltage characteristics as shown in FIG. 3 and, thus, it is possible to obtain a sufficient dynamic range with about three figures at a voltage amplitude of about 4 V to about 5 V. For example, it suffices to change the voltage applied to one of the electrodes of the device within a range of between 0 V and +5 V with a voltage of −5 V kept applied to the other electrode.

However, in the case of performing such a control, the current leakage takes place during the nonselection, i.e., when the minimum potential difference is provided between the electrodes. It is ideal for the leakage current to be as close to zero as possible in view of the power consumption and the load on the driver IC. However, the current leakage is not necessarily suppressed sufficiently at the present stage.

BRIEF SUMMARY OF THE INVENTION

According to a first aspect of the present invention, there is provided an electron emitting device comprising a substrate, a pair of electrodes formed on the substrate and spaced apart from each other, a pair of electrically conductive layers formed on the electrodes, respectively, a distance between the electrically conductive layers being shorter than a distance between the electrodes, and an electron emitting layer formed between the electrically conductive layers and containing carbon and tin.

According to a second aspect of the present invention, there is provided an electron emitting device comprising a substrate, a pair of electrodes formed on the substrate and spaced apart from each other, a pair of electrically conductive layers formed on the electrodes, respectively, a distance between the electrically conductive layers being shorter than a distance between the electrodes, and an electron emitting layer comprising a lower layer formed between the electrically conductive layers and containing tin and an upper layer formed on the lower layer and containing carbon.

According to a third aspect of the present invention, there is provided a method of manufacturing an electron emitting device, comprising forming a pair of electrodes spaced apart from each other on a substrate, forming a pair of electrically conductive layers on the electrodes, respectively, a distance between the electrically conductive layer being shorter than a distance between the electrodes, and forming an electron emitting layer containing tin and carbon between the electrically conductive layers, wherein formation of the electron emitting layer includes applying a voltage between the electrodes in an atmosphere containing a mixture of a compound with tin therein and a compound with carbon therein and/or a compound with tin and carbon therein to deposit a material containing tin and carbon between the electrically conductive layers.

DETAILED DESCRIPTION OF THE INVENTION

Figure 1:
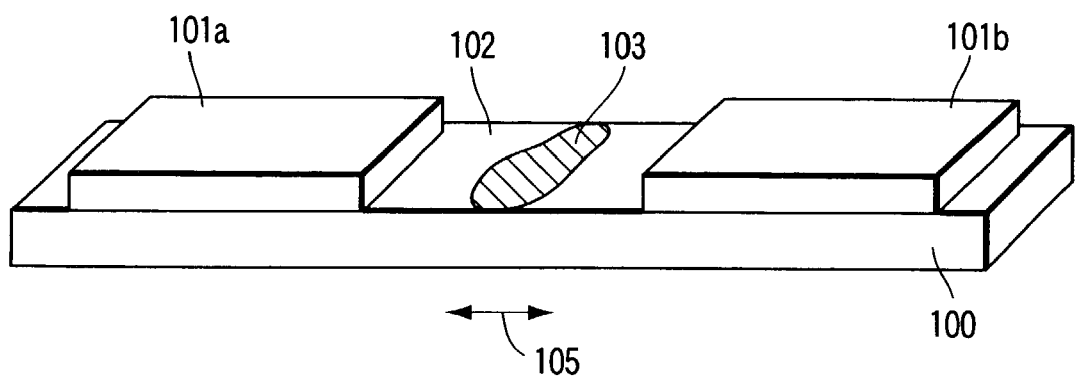
FIG. 1 is an oblique view schematically showing as an example the construction of a conventional electron emitting device.
Figure 2:
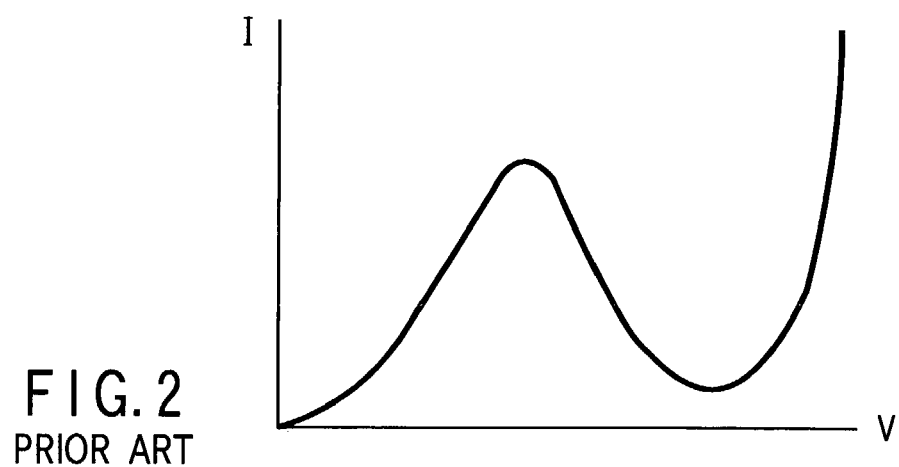
FIG. 2 is a graph showing the current-voltage characteristics of the electron emitting device shown in FIG. 1.
Figure 3:
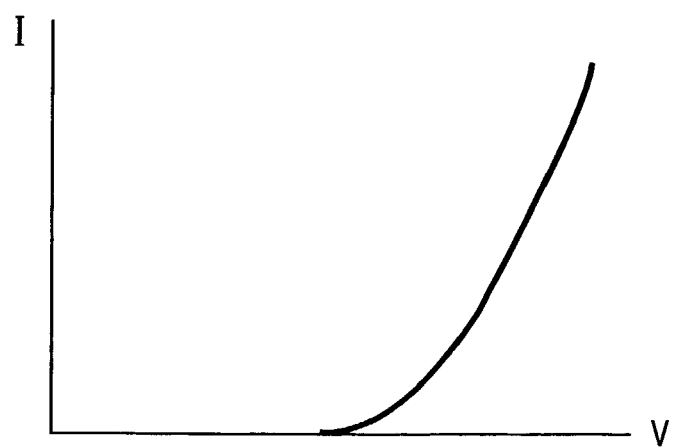
FIG. 3 is a graph showing the current-voltage characteristics of another conventional electron emitting device.

Some embodiments of the present invention will now be described in detail with reference to the accompanying drawings. Incidentally, throughout the drawings, the constituting members, etc., performing the same or similar functions are denoted by the same reference numerals so as to avoid an overlapping description.

Figure 4A:
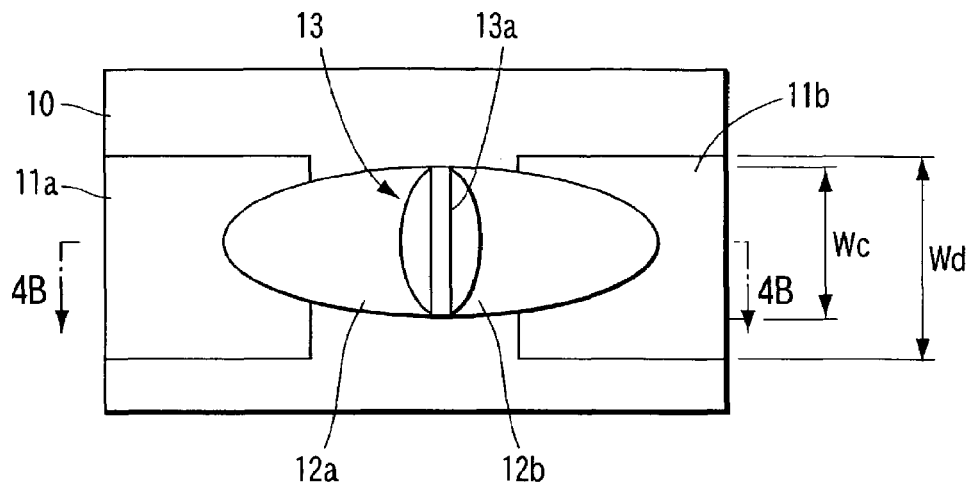
FIG. 4A is a plan view schematically showing the construction of a planar electron emitting device according to a first embodiment of the present invention.
Figure 4B:
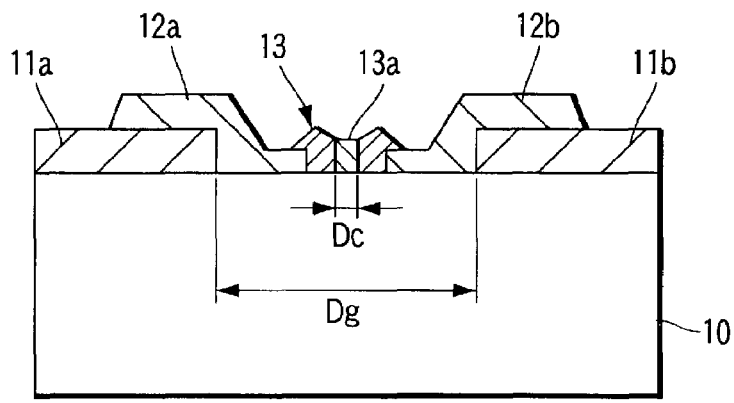
FIG. 4B is a cross-sectional view of the electron emitting device along the line 4B-4B shown in FIG. 4A.
Figure 4C:
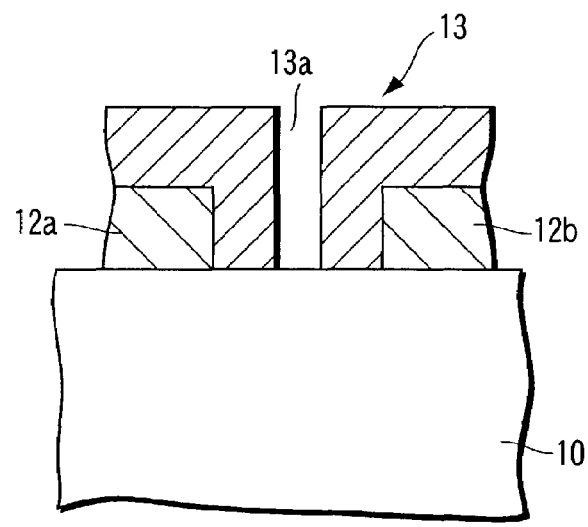
FIG. 4C is a cross-sectional view showing as an example the construction of an electron emitting layer that can be utilized in the electron emitting device shown in each of FIGS. 4A and 4B.

FIG. 4A is a plan view schematically showing the construction of a planar electron emitting device according to a first embodiment of the present invention. FIG. 4B is a cross-sectional view of the electron emitting device along the line 4B-4B shown in FIG. 4A. Further, FIG. 4C is a cross-sectional view showing as an example an electron emitting layer that can be utilized in the electron emitting device shown in FIGS. 4A and 4B. The cross-sectional view shown in FIG. 4C corresponds to the cross section along the line 4B-4B shown in FIG. 4A.

The electron emitting device shown in FIGS. 4A and 4B includes a substrate 10, electrodes 11a and 11b formed on the substrate 10, electrically conductive layers 12a and 12b formed on the electrodes 11a and 11b, respectively, and an electron emitting layer 13 formed on the electrically conductive layers 12a and 12b.

An insulating material or a material having a high resistivity can be used as the material of the substrate 10. Therefore, the substrate 10 may be a substrate containing $SiO_2$ as a main component such as a quartz glass substrate, a sodium glass substrate, a soda-lime glass substrate, a borosilicate glass substrate or a phosphorus glass substrate, an insulating oxide substrate such as an $Al_2O_3$ substrate, or an insulating nitride substrate such as an AlN substrate. It is possible to take account of the economy, the productivity, etc. in selecting the substrate 10. Also, it is desirable for the substrate 10 to exhibit a dielectric strength not lower than $10^7$ V/cm in the vicinity of the surface. For this reason, it is desirable for the mobile ion species such as $Na^+$ to be removed in advance from the region in the vicinity of the surface. Therefore, in the case of using a material containing mobile ion species such as a sodium glass, it is desirable to form a diffusion preventing layer such as a SiN layer on the surface and to further form a surface layer such as a $SiO_2$ film on the surface of the diffusion preventing layer.

As the material of the electrodes 11a and 11b, an electrically conductive metal, a semiconductor or a semi-metal material can be used. Preferably, a transition metal having a high electrical conductivity and having a high resistance to oxidation is used as the material of the electrodes 11a and 11b. For example, it is desirable to use Ni, Au, Ag, Pt or Ir as the material of the electrodes 11a and 11b. In general, each of the electrodes 11a and 11b is formed in a thickness falling within a range of between tens of nanometers and several micrometers. The electrodes 11a and 11b formed in a thickness of this level generally permit obtaining a sufficient electrical conductivity. It is also desirable for the electrodes 11a and 11b to be formed in a uniform thickness and to be free from peeling, swelling and cupping as much as possible.

The film-forming method utilized for forming the electrodes 11a and 11b may be, for example, a vacuum deposition method, a plating method, and a method in which an electrically conductive material is precipitated from a colloidal liquid. Where the adhesion of the film formed by the method noted above to the substrate 10 is poor, it is desirable to form in advance an irregularity of a nanometer scale on the surface of the substrate 10, or to provide an adhesive layer between the substrate 10 and the film thereon. For forming the electrodes 11a and 11b, it is possible to employ the combination of the film-forming method and a photolithography technology, the combination of the film-forming method and a lift-off process, a mask vapor deposition method, a screen printing method, or an offset printing method. It is preferable to use a method by which a film that is hardly peeled off can be formed.

The width Wd of each of the electrodes 11a and 11b and the width Wc of each of the electrically conductive layers 12a and 12b are determined in view of the required emission current amount and the area that the device is allowed to occupy. In general, the width Wc is smaller than the width Wd, and the width Wd can be set at, for example, 1 mm. Also, the distance Dg between the electrodes 11a and 11b can be set appropriately within a range of, for example, between scores of nanometers and scores of micrometers. The distance Dg can be determined in view of, for example, the patterning method employed and the allowable range in the nonuniformity of the characteristics among the devices.

The electrically conductive layers 12a and 12b provide a slit, which is narrower than the distance between the electrodes 11a and 11b, between the electrodes 11a and 11b. In addition, the electrically conductive layers 12a and 12b perform the function of an underlayer on which the electron emission film 13 is deposited.

As the material of the electrically conductive layers 12a and 12b, a metal, a semi-metal or a semiconductor can be utilized. It is desirable for each of the electrically conductive layers 12a and 12b to be sufficiently thin such that the thickness thereof is close to the limit at which the layers 12a and 12b are rendered discontinuous and to be thick enough to ensure a sufficient electrical conductivity. It is particularly desirable to use a transition metal that can be used as a catalyst such as Ni, Co, Fe, Pd, Au, Pt, or Ir as the material of the electrically conductive layers 12a and 12b, though the material of the electrically conductive layers 12a and 12b is not limited to the transition metals exemplified above. The electrically conductive layers 12a and 12b are obtained in general by forming continuous films of a prescribed size, followed by applying a voltage between the electrodes 11a and 11b. By the voltage application, the continuous films are partially melted and ruptured so as to be converted into discontinuous films. Incidentally, the film-forming method that can be employed for forming the continuous film noted above includes, for example, a sputtering method, a CVD (Chemical Vapor Deposition) method, an MBE (Molecular Beam Epitaxy) method, a vacuum vapor deposition method such as a laser abrasion method, a precipitation method in which an electrically conductive material is precipitated from a plating solution or a colloidal solution, and a self-organized film precipitation method using metal and semiconductor ultra fine particles having the surfaces stabilized by organic molecules such as alkane thiol molecules.

The electron emitting layer 13 is formed on the electrically conductive layers 12a and 12b and within the slit formed between the electrically conductive layers 12a and 12b, and is electrically connected to the electrically conductive layers 12a and 12b. The width Dc of the electron emitting layer 13 is markedly small, which is generally several nanometers.

A part of the electron emitting layer 13 constitutes an electron emitting section 13a that emits electrons when an electric current is allowed to flow between the electrodes 11a and 11b. The electron emitting section 13a is a region having a resistivity higher than, for example, the resistivity of the surrounding region. The particular high resistivity region can be formed by, for example, forming a crack in the electron emitting layer 13 as shown in FIG. 4C or by allowing a part of the electron emitting layer 13 to differ in composition from the surrounding region. Incidentally, where a crack is formed in the electron emitting layer 13 as shown in FIG. 4C, it is possible for the crack (or slit) to completely divide the electron emitting layer 13 or to incompletely divide the electron emitting layer 13.

In the electron emitting device according to the first embodiment of the present invention, the electron emitting layer 13 contains carbon and tin. In the case of employing the particular construction, it is possible to suppress markedly the current leakage, compared with the case where the electron emitting section contains carbon as a main component and does not contain tin.

In the present embodiment, it is desirable for a ratio of the signal intensity of tin to the signal intensity of carbon, which is obtained in the case of performing the SIMS (Secondary Ion Mass Spectrometer) analysis for the electron emitting layer 13 under the conditions given below, to be not larger than 1.6:

Primary ion: $O^{2+}$
    Accelerating voltage=2 kV
    Incident angle=25°
    Ion current=15 nA
    Raster width=200 μm
Secondary ion: Positive ion The present inventors have found by experience that, if the tin content of the electron emitting layer 13 is increased, it is impossible to obtain a sufficient device current, and the emission efficiency (or "efficiency": emission current/device current) is lowered. If the signal intensity ratio noted above is equal to or lower than 1.6, it is possible to suppress the current leakage without deteriorating the device characteristics.

Also, in the present embodiment, it is desirable for a ratio of the signal intensity of tin to the signal intensity of carbon, which is obtained in case of performing the SIMS analysis for the electron emitting layer 13 under the conditions given above, to be not smaller than 0.1. Where the signal intensity ratio noted above is lower than 0.1, the effect of suppressing the current leakage fails to be generated prominently.

The electron emitting device of the construction described above can be manufactured by the method described in the following. First of all, the apparatus that can be used for forming the electron emitting layer 13 will be described and, then, an example of the manufacturing process of the electron emitting device will be described.

Figure 5:
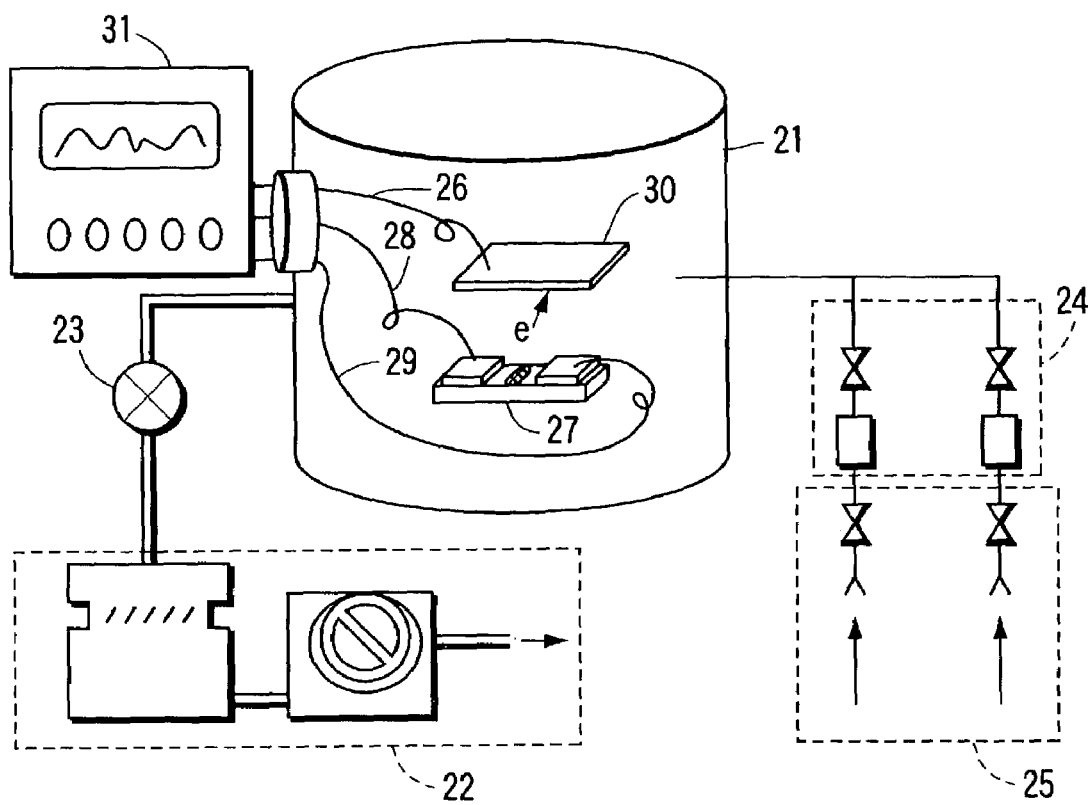
FIG. 5 schematically shows the construction of an apparatus that can be used for forming the electron emitting layer included in the electron emitting device shown in each of FIGS. 4A and 4B.

FIG. 5 schematically shows the construction of an apparatus that can be used for forming the electron emitting layer 13 included in the electron emitting device shown in FIGS. 4A and 4B. The apparatus shown in FIG. 5 includes a vacuum container 21, which is connected to an exhaust system 22 via an exhaust pipe that is provided with a gate valve 23. The vacuum container 21 also connected to a raw material gas supply system 25 via an inlet pipe that is provided with a flow rate control section 24. The vacuum container 21 contains an electron emitting device 27, which is equal to the device shown in FIGS. 4A and 4B, and an anode 30. The anode 30 is electrically connected to a voltage application-measuring section 31 via a wiring 26. Also, the electrodes of the electron emitting device 27 are connected to the voltage application-measuring section 31 via wiring 28 on the negative side and wiring 29 on the positive side, respectively.

It is possible to use, for example, a metal chamber that is used in the ordinary vacuum apparatus as the vacuum container 21. It is desirable for the degree of vacuum reached by the vacuum container 21 to be not higher than $10^{-7}$ Torr, more desirably not higher than $10^{-10}$ Torr. Also, it is desirable for the exhaust system 22 to be free from an oil. For example, it is possible to use a magnetic levitated turbo molecular pump, a diaphragm pump, a scroll pump, an ion pump, a titanium sublimation pump, a getter pump, a sorption pump or a combination thereof for forming the discharge system 22.

The raw material gas supply system 25 includes a container containing a raw material, a container temperature control mechanism that controls the vapor pressure of the raw material, and a primary pressure control mechanism for the raw material gas. Whether the raw material contained in the container is a gas, a liquid or a solid, it is possible to control appropriately the container temperature and the primary pressure. It is possible for the raw material gas supply system to include a plurality of supply systems which are arranged in parallel so as to permit a plurality of raw material gases to be supplied simultaneously.

An example of the manufacturing process of the electron emitting device shown in FIGS. 4A and 4B will now be described.

First, the substrate 10 (or device 27) having the electrodes 11a and 11b and the electrically conductive layer 12 formed thereon is transported into the vacuum container 21 of the apparatus shown in FIG. 5. At this stage, the electrically conductive layer 12 is not divided into the electrically conductive layers 12a and 12b. Then, the wirings 28 and 29 are connected to the electrodes 11a and 11b, respectively, followed by evacuating the container 21.

Next, an electric current is allowed to flow between the electrodes 11a and 11b connected to the wirings 28 and 29, respectively. As a result, heat is generated from the electrically conductive layer 12 so as to cause a part of the material constituting the electrically conductive layer 12 to be agglomerated, thereby forming a discontinuous portion in the electrically conductive layer 12. The discontinuous portion is immediately expanded so as to divide the electrically conductive layer 12 into the part 12a on the positive side and the part 12b on the negative side. As a result, the electric current substantially fails to flow between the electrodes 11a and 11b. The power supply is stopped at this stage.

Then, a gas used as a material of the electron emitting layer 13 is introduced into the vacuum container 21, and the gaseous pressure within the container 21 is stabilized at a prescribed value by controlling the flow rate and the discharge rate of the gas. The pressure within the vacuum container 21 can be measured by using, for example, an ion gauge. Also, it is possible to control the pressure within the vacuum container 21 by using, for example, a quadrupole mass spectrometer while monitoring the composition of the gas species within the vacuum container 21. The desirable pressure within the vacuum container 21, which is dependent on the activating gas used, generally falls within a range of between about $10^{-1}$ Torr and about $10^{-8}$ Torr.

If an electric power is supplied to the device 27 by using the conducting section 31, the raw material gas is decomposed by, for example, the emitted electrons, the electric field and heat, with the result that a material containing tin and carbon is deposited between the electrically conductive layers 12a and 12b. Incidentally, the waveform of the voltage that the conducting section 31 applies may be a linear waveform, a triangular waveform, a rectangular waveform or a pulse waveform.

In accordance with progress of the deposition, the device current is increased. The deposition is stopped by stopping the current supply at the time when the device current has been sufficiently increased. The criterion for the judgment on the completion of the power supply can be determined on the basis of, for example, the current required for the device or the current-voltage characteristics.

After completion of the deposition, the residual raw material gas is sufficiently removed so as to suppress further deposition and, thus, to stabilize the characteristics. The electron emitting layer 13 can be obtained as described above. The electron emitting device shown in FIGS. 4A and 4B can be manufactured by, for example, the method described above.

In the first embodiment, the raw material supplied from the raw material supply system 25 into the vacuum container 21 contains a compound with tin therein and/or a compound with tin and carbon therein. The compound with tin therein and the compound with both tin and carbon therein include, for example, tin halides such as tin chloride [$SnCl_2$] and tin fluoride [$SnF_2$]; tin-containing chain hydrocarbons such as tetramethyl tin [$Sn(CH_3)_4$] and tetraethyl tin [$Sn(C_2H_5)_4$]; and tin-containing aromatic hydrocarbons such as tetraphenyl tin [$Sn(C_6H_5)_4$]. In the case of using the compound that does not contain carbon, it is desirable to supply a material containing carbon such as hydrocarbon into the vacuum container 21 together with the compound that does not contain carbon. Alternatively, it is possible to supply a carbon-containing material for a prescribed time, followed by stopping the supply of the carbon-containing material and subsequently supplying a material containing tin into the vacuum container 21.

It is possible for the raw materials supplied from the raw material gas supply system 25 into the vacuum container 21 to include an additional compound together with the compound with tin therein and/or the compound with tin and carbon therein. The additional compound noted above includes, for example, amines such as ethyl amine, dimethyl amine and trimethyl amine; nitrites such as acrylonitrile; nitro compounds such as nitro methane; carboxylic acids;

esters; aldehydes; borides such as alkyl borane, aryl borane, and alkoxy borane; and halides such as alkyl halide, aryl halide and acyl halide.

Incidentally, traces of nitrogen can be detected in general from the electron emitting layer 13 formed by using an amine or a nitrile as the additional compound referred to above. Also, traces of oxygen can be detected in general from the electron emitting layer 13 formed by using a nitro compound, a carboxylic acid, an ester or an aldehyde as the additional compound referred to above. Further, traces of a halogen element can be detected in general from the electron emitting layer 13 formed by using a halide as the additional compound referred to above. It should be noted in this connection that, where a mixture of a compound with tin therein and a compound with carbon therein, or a compound with tin and carbon therein, further contains hydrogen, nitrogen, oxygen, boron, and at least one kind of the halogen element, the element noted above can be detected in general from the electron emitting layer 13 even if the additional compound in question is not used.

As described above, in the first embodiment of the present invention, it is possible for th electron emitting layer 13 to contain additional elements together with carbon and tin. To be more specific, it is possible for the electron emitting layer 13 to contain nitrogen and oxygen at a concentration of, for example, 2 atomic % to 3 atomic % with respect to carbon in the electron emitting layer 13. It is also possible for the electron emitting layer 13 to contain boron and halogen at a concentration of, for example, 1 atomic % or less with respect to carbon in the electron emitting layer 13. Further, it is possible for the electron emitting layer 13 to contain hydrogen at a concentration of, for example, several atomic % or less with respect to carbon in the electron emitting layer 13.

A second embodiment of the present invention will now be described. The electron emitting device according to the second embodiment has a construction similar to that of the electron emitting device according to the first embodiment described above, except that the second embodiment differs from the first embodiment in the construction of the electron emitting layer 13.

Figure 6:
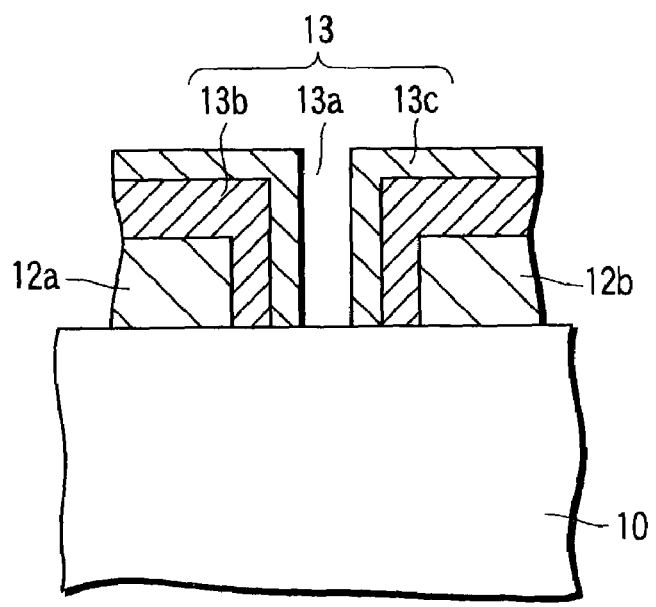
FIG. 6 is a cross-sectional view showing as an example the construction of an electron emitting layer that can be utilized in an electron emitting device according to a second embodiment of the present invention.

FIG. 6 is a cross-sectional view showing as an example the construction of an electron emitting layer that can be utilized in the electron emitting device according to the second embodiment of the present invention. In the second embodiment, the electron emitting layer 13 contains carbon and tin as in the first embodiment. In addition, the concentration of tin contained in the electron emitting layer 13 is higher on the side of the substrate 10 than that on the side of the upper surface of the electron emitting layer 13. For example, the electron emitting layer 13 has a laminate structure of a region 13b on the side of the substrate 10 and another region 13c on the side of the upper surface of the electron emitting layer 13. Naturally, the tin concentration in the substrate-side-region 13b is higher than that in the surface-side-region 13c. Incidentally, it is possible for the surface-side-region 13c not to contain tin. According to the particular construction, it is possible to suppress the current leakage so as to provide an electron emitting device exhibiting a higher emission efficiency.

It is noted that an "upper surface" or "upper portion" means a surface or portion that is spaced apart from the substrate 10. On the other hand, a "lower surface" or "lower portion" means a surface or portion that is disposed between the "upper surface" or "upper portion" and the substrate 10.

In the second embodiment, it is desirable for a ratio of the signal intensity of tin to the signal intensity of carbon to be not higher than 1.6 in the case of performing an SIMS analysis on the surface-side-region 13c of the electron emitting layer 13 under the conditions equal to those described previously in conjunction with the first embodiment. Where the tin concentration in the region 13c is low, it is possible to achieve a higher emission efficiency. Also, it is desirable for a ratio of the signal intensity of tin to the signal intensity of carbon to be higher than 1.6 in the case of performing an SIMS analysis on the surface-side-region 13b of the electron emitting layer 13 under the conditions equal to those described previously in conjunction with the first embodiment. If the tin content of the region 13b is increased, the effect of suppressing the current leakage is promoted. In addition, in the second embodiment, increase in tin content of the region 13b scarcely cause the emission efficiency to be lowered, if the tin content of the region 13c is sufficiently low. It follows that, where the signal intensity ratio in the surface-side-region 13c is not higher than 1.6 and where the signal intensity ratio in the substrate-side-region 13b is higher than 1.6, the effect of suppressing the current leakage and improving the emission efficiency is rendered most prominent.

In the second embodiment, it is unnecessary for the electron emitting layer 13 to be separated clearly into the region 13b having a higher tin concentration and the region 13c having a lower tin concentration as shown in FIG. 6. For example, it is possible for the tin concentration within the electron emitting layer 13 to be consecutively lowered from the substrate side toward the upper surface side.

The electron emitting device according to the second embodiment differs from the device according to the first embodiment in that the electron emitting layer 13 has a tin concentration gradient. The particular concentration gradient can be achieved by carrying out the deposition described previously in conjunction with the first embodiment in a plurality of steps. For example, a raw material gas containing a compound with tin therein and another compound with carbon therein is introduced into the vacuum container 21 so as to make the atmosphere in the vacuum container 21 contain these compounds. Then, a voltage is applied between the electrodes 11a and 11b in the particular atmosphere so as to deposit a material containing carbon and tin. After the voltage application between the electrodes 11a and 11b is stopped, the supply of the compound with tin therein is stopped while continuing the supply of the compound with carbon therein into the vacuum container 21, so as to remove the compound with tin therein from the atmosphere within the vacuum container 21 and to make the atmosphere within the vacuum container 21 contain the compound with carbon therein. Then, a voltage is applied again between the electrodes 11a and 11b in the particular atmosphere so as to deposit a material containing carbon and not containing tin. In this fashion, it is possible to obtain the electron emitting layer 13 having a tin concentration gradient that the concentration on the side of the substrate 10 is higher than that on the side of the upper surface of the electron emitting layer 13.

Incidentally, it is possible for the raw material gas supplied into the vacuum container 21 in the first deposition process to contain only a compound with tin therein. Also, it is possible for the raw material gas supplied into the vacuum container 21 in the final deposition process to contain a compound with tin therein, if the ratio of the compound with tin therein to the compound with carbon therein is lower than that of the raw material gas supplied into the vacuum container in the first deposition process.

It is possible to form the electron emitting layer 13, which has a higher tin concentration on the side of the lower surface than that on the side of the upper surface, as follows. Specifically, a raw material gas containing a compound with tin therein and another compound with carbon therein, which are mixed at a prescribed mixing ratio, is introduced into the vacuum container 21 so as to make the atmosphere within the vacuum container 21 contain the raw material gas. While a material containing carbon and tin is being deposited by applying a voltage between the electrodes 11a and 11b in the particular atmosphere, the ratio of the compound with tin therein to the compound with carbon therein, which are contained in the raw material gas, is rapidly decreased or gradually decreased over a relatively long time. It is also possible to obtain the electron emitting layer 13 by the method described above.

The electron emitting device according to each of the first and second embodiments described above can be applied to, for example, a display. An example of the display to which the electron emitting device is applied will now be described.

Figure 7:
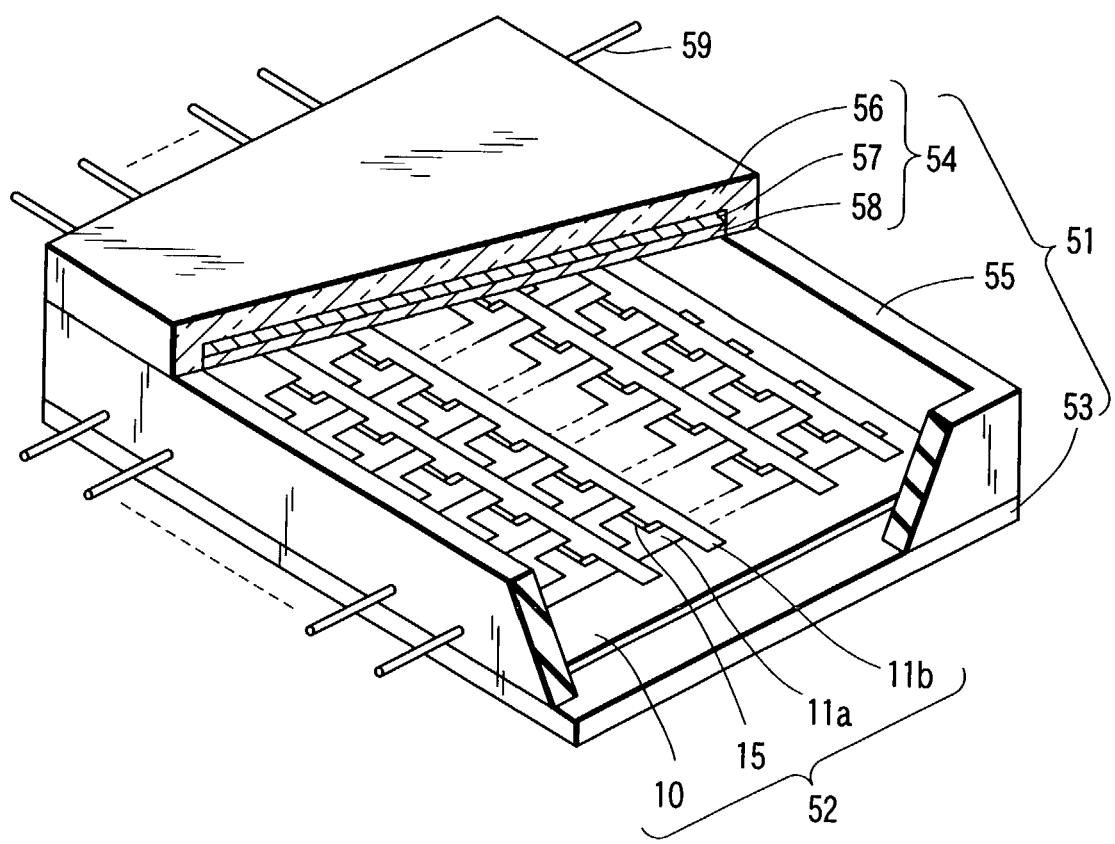
FIG. 7 is a partly-cutaway oblique view schematically showing an example a planar display using the electron emitting device according to the first or second embodiment of the present invention.

FIG. 7 is a partly-cutaway oblique view schematically showing an example a planar display using the electron emitting device according to the first or second embodiment of the present invention. The display shown in FIG. 7 includes a casing 51 forming a space of vacuum therein and an electron source substrate 52 housed in the casing 51.

The casing 51 includes a rear plate 53 having the electron source substrate 52 mounted to one main surface thereof, a face plate 54 arranged to face the electron source substrate 52, and a frame body 55 interposed between the rear plate 53 and the face plate 54. The clearance between the rear plate 53 and the frame body 55 and the clearance between the face plate 54 and the frame body 55 are sealed with, for example, a frit glass.

The face plate 54 includes a glass substrate 56, a phosphor film 57 formed on a surface of the glass substrate 56 that faces the electron source substrate 52, and a metal back 58 formed on the phosphor film 57. Incidentally, a reference numeral 59 shown in FIG. 7 denotes a high voltage terminal electrically connected to the metal back 58. The phosphor film 57 contains a phosphor that emits light upon irradiation with an electron beam from the electron source substrate 52. The metal back 58 reflects the light from the phosphor toward the glass substrate 56, forms electric field that accelerate electron, and prevent the phosphor film 57 from being damaged by the collision of the negative ions generated within the casing 51. It is not absolutely necessary to arrange the metal back 58. Alternatively, it is possible to arrange a transparent electrode such as an ITO film between the phosphor film 57 and the glass substrate 56 in place of arranging the metal back 58. It is also possible to use in combination both the metal back 58 and the transparent electrode.

Each of the rear plate 53, the face plate 54 and the frame body 55 has a mechanical strength high enough to withstand the difference in pressure between the inside and the outside of the casing 51. Where the electron source substrate 52 has a mechanical strength high enough to withstand the pressure difference noted above, it is possible to use the electron source substrate 52 as a rear plate. In other words, the rear plate 53 can be omitted. Also, in order to further improve the mechanical strength of the casing 51 relative to the pressure difference noted above, it is possible to arrange a spacer between the rear plate 53 and the face plate 54.

The electron source substrate 52 is constructed such that a plurality of electron emitting devices described previously in conjunction with the first and second embodiments form a matrix. To be more specific, the electron source substrate 52 includes a plurality of wirings 11a and 11b extending in the vertical and lateral directions on the substrate 10 and electrically insulated from each other, and a plurality of device bodies 15 arranged in the vertical and lateral directions on the substrate 10 and each electrically connected to one of the wrings 10a and one of the wirings 10b. Incidentally, the device body 15 is formed of the electrically conductive layers 12a, 12b and the electron emitting layer 13 described previously in conjunction with each of the first and second embodiments.

The display shown in FIG. 7 is operated by, for example, changing the voltage applied to the device body 15 between a voltage lower than the threshold voltage and a voltage not lower than the threshold voltage while maintaining the metal back 58 at a prescribed positive potential. To be more specific, if the voltage applied to the device body 15 is set at the threshold voltage or higher, electrons are emitted from the electron emitting layer 13 of the device body 15. The electrons emitted from the electron emitting layer 13 are sufficiently accelerated by the electric field formed by the metal back 58 so as to excite the phosphor contained in the phosphor film 57. As a result, the phosphor contained in the phosphor film 57 emits light, and the light can be observed as a display light on the side of the face plate 54.

The description given above covers the case where the electron emitting device according to each of the first and second embodiments is applied to a display constructed as shown in FIG. 7. Alternatively, it is also possible to apply the electron emitting device according to each of the first and second embodiments to a display having another construction. Further, it is possible to apply the electron emitting device according to each of the first and second embodiments to, for example, a light exposure apparatus.

Examples of the present invention will now be described.

EXAMPLE 1

A plurality of electron emitting devices (samples [1] to [8]) constructed as shown in FIGS. 4A and 4B and differing from each other in the composition of the raw material gas used for forming the electron emitting layer 13 were prepared by a method similar to the method described previously in conjunction with the first embodiment. In each of the samples, the substrate 10 was made of a quartz glass, Ir films were used as the electrodes 11a and 11b, and Au films prepared by the vapor deposition method were used as the electrically conductive layers 12a and 12b. The width Wc of each of the electrically conductive layers 12a and 12b was set at 100 μm, and the distance Dg between the electrodes 11a and 11b was set at 5 μm. Also, a voltage of 10 V was applied between the electrodes 11a and 11b in forming the electron emitting layer 13. Table 1 shows the composition of the raw material gas, the total pressure within the vacuum container 21, the time during which a voltage was applied to the device in forming the electron emitting layer 13, and the voltage waveform.

TABLE 1

| Sample | Raw material gas | Flow rate | Total pressure | Time | Waveform |
|---|---|---|---|---|---|
| [1] | $Sn(C_2H_5)_4 + C_6H_6$ | 1:2 | $3 \times 10^{-4}$ Pa | 10 min | Triangular wave, 120 Hz |
| [2] | $Sn(C_2H_5)_4 + C_6H_6$ | 2:1 | $3 \times 10^{-4}$ Pa | 5 | Triangular |

TABLE 1-continued

| Sample | Raw material gas | Flow rate | Total pressure | Time | Waveform |
|---|---|---|---|---|---|
| [3] | $Sn(C_2H_5)_4$ | — | $1 \times 10^{-4}$ Pa | 5 min | Triangular wave, 120 Hz |
| [4] | $SnCl_2 + C_6H_6$ | 1:5 | $4 \times 10^{-4}$ Pa | 5 min | Triangular wave, 120 Hz |
| [5] | $Sn(C_2H_5)_4 + C_6H_6$ | 4:5 | $3 \times 10^{-4}$ Pa | 10 min | Triangular wave, 100 Hz |
| [6] | $Sn(C_2H_5)_4 + C_6H_6$ | 5:4 | $3 \times 10^{-4}$ Pa | 10 min | Triangular wave, 120 Hz |
| [7] | $SnCl_2 + C_6H_6$ | 1:7 | $4 \times 10^{-4}$ Pa | 5 min | Triangular wave, 120 Hz |
| [8] | $C_6H_6$ | — | $1 \times 10^{-4}$ Pa | 5 min | Triangular wave, 100 Hz wave, 120 Hz |

In respect of samples [1] to [8] obtained by the method described above, the device current, the emission current, and the efficiency were measured with the electron emitting layer 13 positioned to face the anode. Incidentally, the device voltage applied between the electrodes 11a and 11b was set at 10 V, and the anode voltage was set at 5 kV. Also examined was the device current (leaking current) at the time when the device voltage applied between the electrodes 11a and 11b was set at 5 V. Table 2 shows the results. Further, for each of samples [1] to [8], the electron emitting layer 13 was analyzed by an SIMS so as to obtain a ratio of the signal intensity of tin to the signal intensity of carbon. Table 2 also shows the result.

TABLE 2

| Sample | Sn/C | Device current | Emission current | Efficiency | Leakage Current |
|---|---|---|---|---|---|
| [1] | 1.6 | 1.0 mA | 15 μA | 1.50% | 3.0 μA |
| [2] | 1.9 | 0.6 mA | 0.2 μA | 0.03% | 2.5 μA |
| [3] | 2.5 | 0.1 mA | 0.05 μA | 0.05% | 1.0 μA |
| [4] | 0.1 | 1.2 mA | 19 μA | 1.58% | 3.0 μA |
| [5] | 1.7 | 1.0 mA | 1.4 μA | 0.14% | 2.9 μA |
| [6] | 1.8 | 0.8 mA | 0.8 μA | 0.10% | 2.9 μA |
| [7] | 0.09 | 1.2 mA | 19 μA | 1.58% | 15 μA |
| [8] | 0 | 1.1 mA | 20 μA | 1.82% | 16 μA |

As shown in Table 2, the leakage current for each of samples [1] to [7] using a gas containing tin was found to be lower than the leakage current for sample [8] using benzene, which is a hydrocarbon, as the raw material. Also, it was possible to suppress the leakage current without lowering the device current and the efficiency in the case where the electron emitting layer 13 contained traces of tin. However, the device current and the efficiency were lowered with increase in the tin concentration.

EXAMPLE 2

By a method similar to the method described previously in conjunction with the first embodiment, prepared were a plurality of electron emitting devices (samples [9] to [12]) constructed as shown in FIGS. 4A and 4B and differing from each other in the composition of the raw material gas utilized for preparing the electron emitting layer 13. It should be noted that a two stage process was employed for forming the electron emitting layer 13 for each of samples [9] and [10]. Specifically, a first deposition was performed by applying voltage between the electrodes 11a and 11b while supplying a raw material gas containing a first compound into the vacuum container 21. Then, the voltage application between the electrodes 11a and 11b was stopped, and the gas containing the first compound was released to the outside of the vacuum container 21. At the same time, the raw material gas supplied into the vacuum container 21 was switched into a raw material gas containing a second compound. After the pressure within the vacuum container 21 was stabilized, the voltage application between the electrodes 11a and 11b was started again so as to perform a second deposition.

For each of the samples, a quartz glass substrate was used as the substrate 10, and Ir films were used as the electrodes 11a and 11b. Further, Ir films prepared by the vapor deposition method were used as the electrically conductive layers 12a and 12b for improving the heat resistance. The width Wc of each the electrically conductive layers 12a and 12b was set at 100 μm, and the distance Dg between the electrodes 11a and 11b was set at 5 μm. Table 3 shows the composition of the raw material gas, the total pressure within the vacuum container 21, the time during which a voltage was applied to the device in forming the electron emitting layer 13, and the voltage waveform.

TABLE 3

| Sample | Raw material gas | Total pressure | Time | Waveform |
|---|---|---|---|---|
| [9] | $C_6H_6$ | $1 \times 10^{-4}$ Pa | 5 min | Triangular wave, 120 Hz |
|  | → $Sn(C_2H_5)_4$ | $1 \times 10^{-4}$ Pa | 0.5 min | Triangular wave, 120 Hz |
| [10] | $Sn(C_2H_5)_4 + C_6H_6$ | $3 \times 10^{-4}$ Pa | 10 min | Triangular wave, 120 Hz |
|  | → $C_6H_6$ | $1 \times 10^{-4}$ Pa | 5 min | Triangular wave, 120 Hz |
| [11] | $Sn(C_2H_5)_4 + C_6H_6$ | $3 \times 10^{-4}$ Pa | 10 min | Triangular wave, 120 Hz |
| [12] | $C_6H_6$ | $1 \times 10^{-4}$ Pa | 5 min | Triangular wave, 120 Hz |

In respect of samples [9] to [12] obtained by the method described above, the device current, the emission current, and the efficiency were measured with the electron emitting layer 13 positioned to face the anode. Incidentally, the device voltage applied between the electrodes 11a and 11b was set at 10 V, and the anode voltage was set at 5 kV. Also examined was the device current at the time when the device voltage applied between the electrodes 11a and 11b was set at 5 V. Table 4 shows the results.

TABLE 4

| Sample | Device current | Emission current | Efficiency | Leakage current |
|---|---|---|---|---|
| [9] | 0.02 mA | 0.01 μA | (0.05%) | 2.2 μA |
| [10] | 1.2 mA | 22 μA | 1.83% | 2.5 μA |
| [11] | 1.0 mA | 15 μA | 1.50% | 3.0 μA |
| [12] | 1.1 mA | 20 μA | 1.82% | 16 μA |

Table 3 shows very short time, i.e., 0.5 minutes, as the film-forming time in an atmosphere containing tetraethyl tin for sample [9]. It should be noted in this connection that, in the process of forming a film in an atmosphere containing tetraethyl tin, the device current was rapidly lowered in 0.5 minutes after initiation of the power supply and, thus, the film formation was suspended in 0.5 minutes after initiation of the power supply. Also, in Table 4, the efficiency for sample [9] is parenthesized. This indicates that the influence of the noise on the value is not negligible, since the device current for sample [9] is very small.

As shown in Table 4, the leakage current for each of samples [9] to [11] using a gas containing tin as the raw material gas was found to be lower than ⅕ of the leakage current for sample [12] using benzene, which is a hydrocarbon, as the raw material. Particularly, it was possible to suppress the leakage current without lowering the device current and the efficiency in samples [10] and [11] relative to sample [12]. Also, sample [10] was found to be capable of suppressing the leakage current and improving the device current and efficiency, compared with sample [12].

Incidentally, in sample [10], the upper surface region of the electron emitting layer 13 having a depth of 10 Å as measured from the surface was free from tin. Also, in sample [10], both tin and carbon were contained in the lower surface region of the electron emitting layer 13 having a height of 10 Å as measured from the upper surface of the substrate 10.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electron emitting device, comprising:
   a substrate;
   a pair of electrodes formed on the substrate and spaced apart from each other;
   a pair of electrically conductive layers formed on the electrodes, respectively, a distance between the electrically conductive layers being shorter than a distance between the electrodes, and the electrically conductive layers covering the substrate at a position between the electrodes; and
   an electron emitting layer comprising a lower layer formed between the electrically conductive layers and containing tin, and an upper layer formed on the lower layer and containing carbon, the electron emitting layer covering upper surfaces of the electrically conductive layers, wherein the upper layer further contains tin, and a concentration of tin in the lower layer is higher than a concentration of tin in the upper layer.

2. The device according to claim 1, wherein the electron emitting layer contains at least one of hydrogen and nitrogen.

3. The device according to claim 1, wherein the lower layer further contains carbon.

4. An electron emitting device, comprising:
   a substrate;
   a pair of electrodes formed on the substrate and spaced apart from each other;
   a pair of electrically conductive layers formed on the electrodes, respectively, a distance between the electrically conductive layers being shorter than a distance between the electrodes; and
   an electron emitting layer comprising a lower layer formed between the electrically conductive layers and containing tin and an upper layer formed on the lower layer and containing carbon and tin, a concentration of tin in the lower layer being higher than a concentration of tin in the upper layer.

5. The device according to claim 4, wherein the lower layer further contains carbon.

\* \* \* \* \*